Nov. 30, 1954

R. J. HARKENRIDER 2,695,822

LUBRICATOR FOR DIESEL LOCOMOTIVE TRACTION
MOTOR SUSPENSION BEARINGS

Filed June 23, 1951

INVENTOR.
Robert J. Harkenrider
BY
Mann, Brown and Hansmann
Attys.

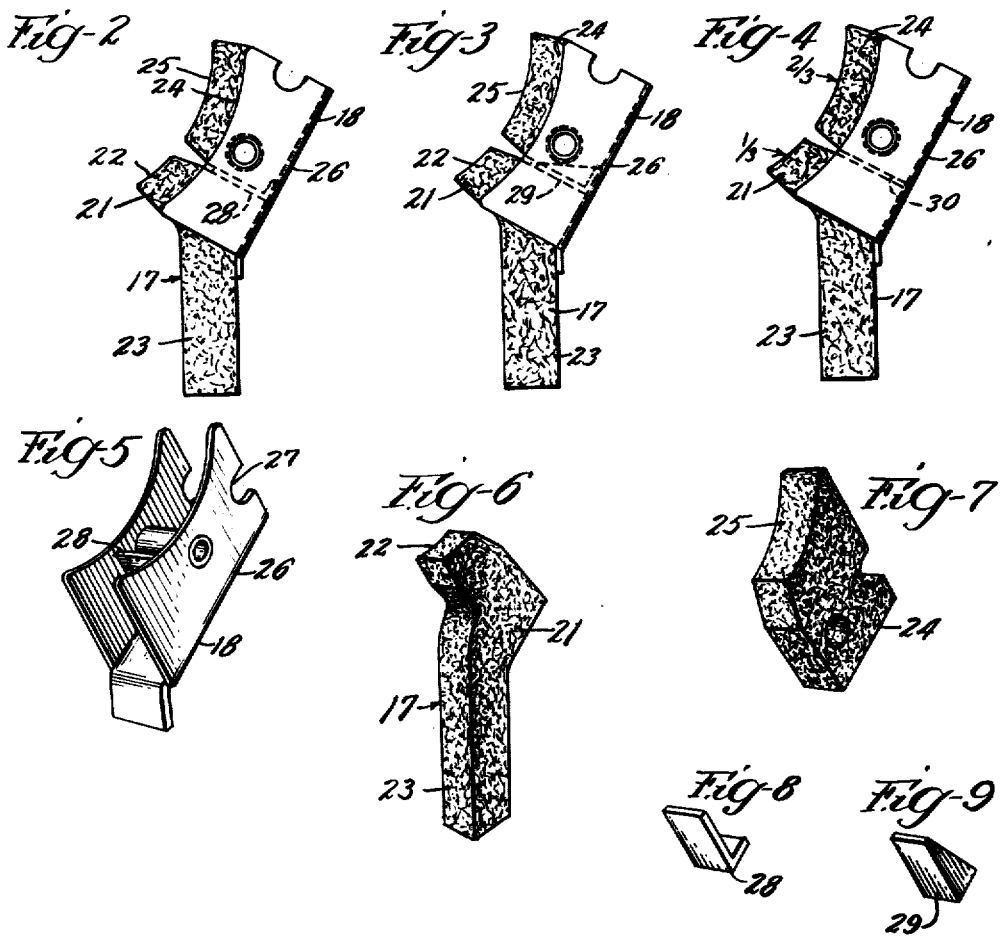

Nov. 30, 1954    R. J. HARKENRIDER    2,695,822
LUBRICATOR FOR DIESEL LOCOMOTIVE TRACTION
MOTOR SUSPENSION BEARINGS
Filed June 23, 1951    3 Sheets-Sheet 3
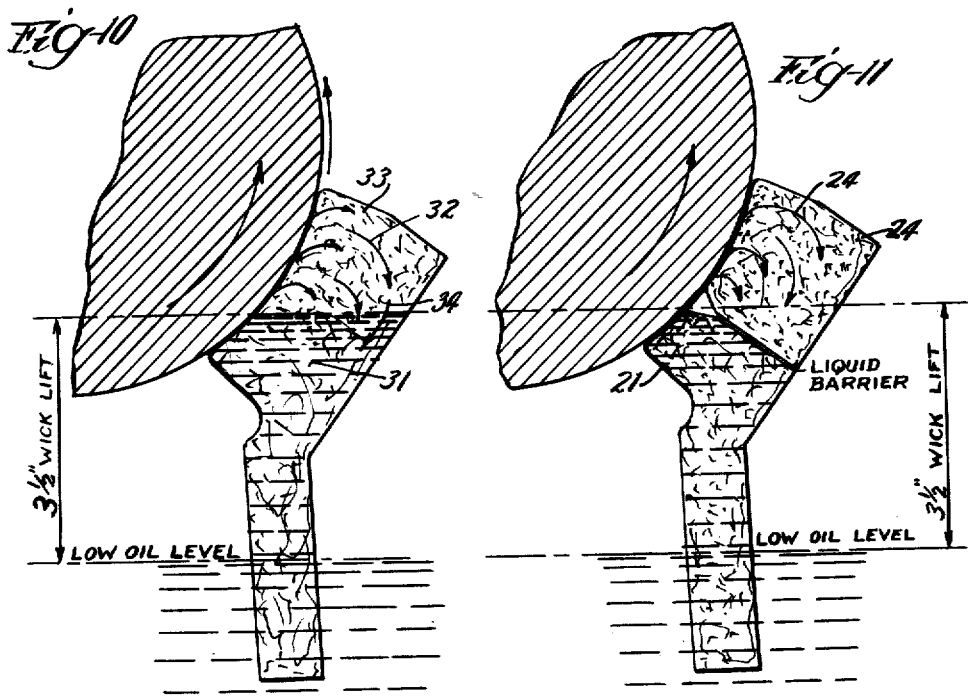
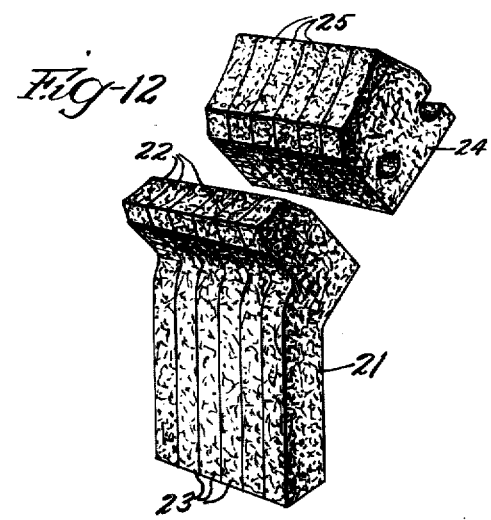
INVENTOR.
Robert J. Harkenrider
BY
Mann, Brown and Hausmann
Attys.

United States Patent Office 2,695,822
Patented Nov. 30, 1954

2,695,822

LUBRICATOR FOR DIESEL LOCOMOTIVE TRACTION MOTOR SUSPENSION BEARINGS

Robert J. Harkenrider, Winona, Minn., assignor to Gladys D. Miller, Winona, Minn.

Application June 23, 1951, Serial No. 233,208

5 Claims. (Cl. 308—132)

The principal object of this invention is to provide better application of oil to the journal as the oil level in the reservoir drops.

Generally speaking, this is accomplished by providing two felt bodies contacting the journal successively as it revolves, one supplied with oil by a wick and the other by a journal.

Further objects and advantages of the invention will appear as the disclosure proceeds and the description is read in connection with the accompanying drawings, in which Fig. 1 is a transverse vertical section through a motor suspension bearing and the axle to which it is applied;

Fig. 2 is a side elevation of an applicator embodying the invention and composed of two felt bodies arranged to contact the journal successively as it revolves;

Figs. 3 and 4 are similar views of slight modifications;

Fig. 5 is a perspective of a felt holder;

Fig. 6 is a perspective view of one of the felt bodies;

Fig. 7 is a perspective view of another felt body, the two to be assembled in a suitable holder such as shown in Figs. 2 and 5;

Fig. 8 is a perspective view of one form of separator between the felt bodies;

Fig. 9 is a perspective view of another form of separator between the felt bodies;

Fig. 10 is a diagram of a prior felt applicator;

Fig. 11 is a similar view of felt bodies embodying the present invention; and

Fig. 12 is a perspective view of a composite felt body made up of a group of narrow bodies.

Figure 1:
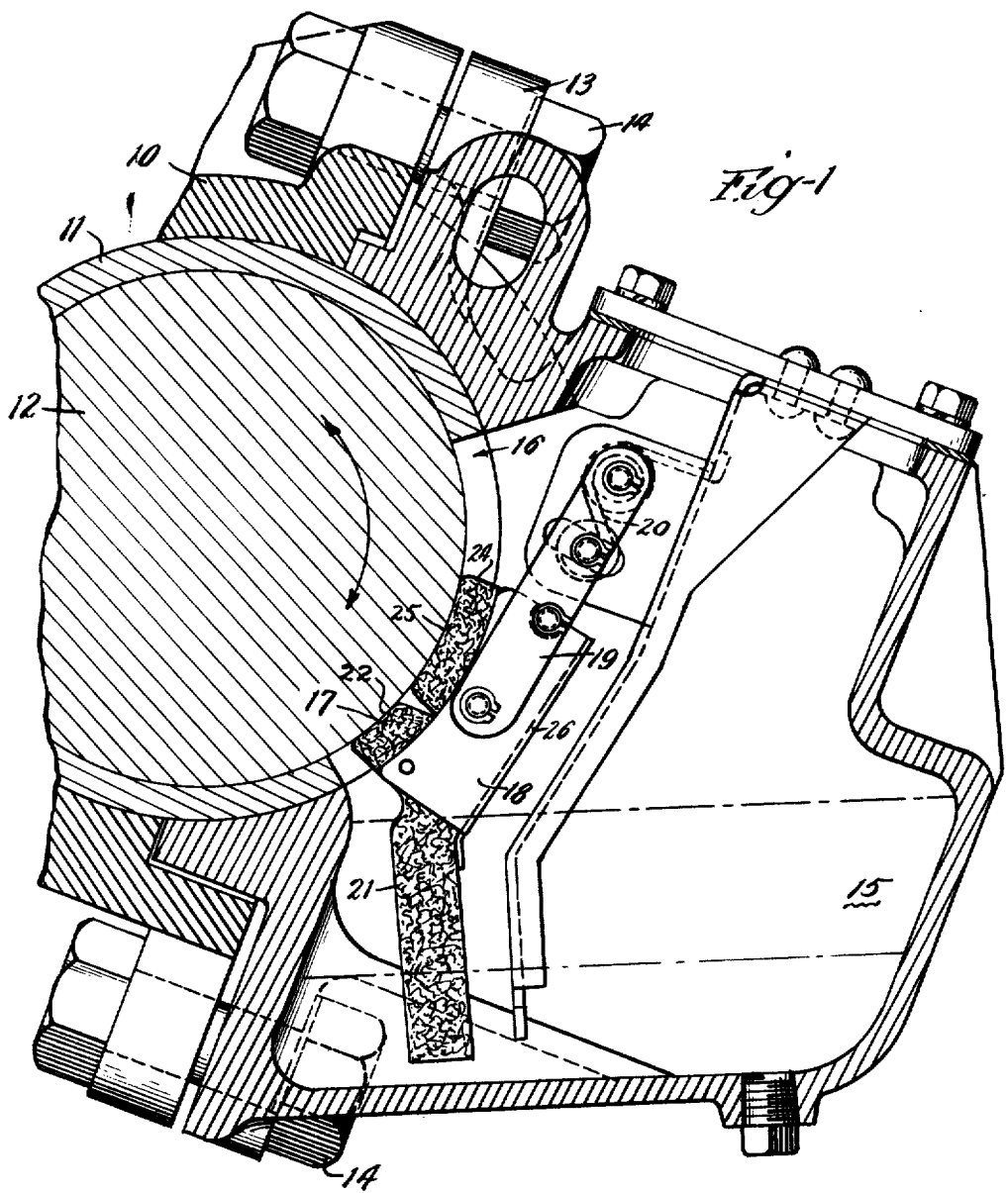

But these diagrammatic drawings and the corresponding description are used for the purpose of disclosure only.

In Fig. 1, the reference numeral 10 indicates a familiar form of motor suspension bearing provided with a liner or shell 11 forming the actual bearing for the wheeled axle 12. Associated with these is a motor suspension bearing cap or axle cap 13 secured to the motor suspension bearing by bolts 14 and provided with an oil reservoir 15.

The means forming the subject matter of this invention is to lift the oil from the reservoir 15 and apply it to the axle 12 through the window opening 16 in the shell or liner 11. That function is performed by a felt body or felt bodies generally indicated by 17 assembled in a holder or holders 18 pivoted to levers 19 and urged toward the axle by springs 20, all substantially as disclosed in my application Ser. No. 109,563, Aug. 10, 1949, now Patent No. 2,640,742, granted June 2, 1953, the disclosure of which is incorporated by reference in the interest of brevity.

According to this invention, the applicator for oil is composed of a felt body 21 having a thickened portion provided with an arcuate surface 22 for contact with the axle to be lubricated, and a depending wick portion 23 to raise oil from the reservoir to the thickened portion and the curved surface 22.

In addition, there is a second separate felt body 24 having an arcuate surface 25 for contact with the journal to be lubricated circumferentially apart from the first arcuate surface.

As shown in Figs. 2 and 5, the two felt bodies are assembled in a holder 26 having flanges 27 grasping the sides of the felt bodies to confine them laterally, but allowing the thickened portions to project a suitable distance beyond the flanges.

The felt bodies may be separated by a partition 28, shown separately in Fig. 8, made of metal, wood fiber, synthetic rubber such as neoprene, buna, Hycar, etc. (Materials Handbook, Brady, McGraw-Hill, 1944, p. 523.)

In the form shown in Figs. 3 and 9, there is a separator 29 of different shape of one of the materials mentioned.

In the form shown in Fig. 4, the felt bodies are separated by a narrow space 30.

The essential requirement is that the two felt bodies be separated by something that will inhibit flow from the body 24 to the body 21.

Referring to Fig. 10, which indicates prior construction with the axle rotating in a counter-clockwise direction, the excess of oil applied by the thickened portion 31 follows the arrows 32, and there is a sort of pumping action that will overcharge the upper portion 33 of the felt body during operation, particularly fast operation. When a locomotive stops, however, that overcharge will drain down, as indicated by the arrows 34, and the upper portion 33 becomes the dry portion of the felt body.

In contrast with that, an applicator embodying the present invention is indicated in Fig. 11.

The excess from 21 is wiped off the journal by the separate felt body 24, and that body 24 becomes charged during the operation. When it gets sufficiently wet, it will apply oil to the journal.

When the locomotive stops, 24 will retain its charge, practical saturation of lubricant, which will be ready to lubricate the journal as soon as the locomotive starts.

On clockwise operation, sufficient oil is carried through the bearing liner and back to the top section 24 to keep it charged.

It has been found in practice that, at low oil level, the arrangement shown in Fig. 11 feeds approximately twice as much oil to a journal as that shown in Fig. 10. The sketches, Figs. 10 and 11, are on the basis of 3½" lift from low oil level line.

It is commercially difficult to make a felt pad having sufficient area corresponding to the curved surface exposed in the window opening with the fibers substantially endwise to fit evenly against the axle journal and feed evenly to the surface of the journal in use. For that reason, the applicator is made up of a group of felts, such as indicated in Fig. 12. They may have individual holders or may be in the same holder as disclosed in the above mentioned application, Ser. No. 109,563, August 10, 1949.

I claim:

1. In a lubricator having an oil reservoir, a felt body having a thickened portion provided with an arcuate surface for contact with a journal to be lubricated, a holder mounting the felt body having lateral flanges of less height than the said thickened portion to embrace the sides thereof and give it lateral support, said felt body having a portion forming a wick depending into the reservoir to raise oil to the thickened portion, and a separate felt body having an arcuate surface for contact with said journal separated circumferentially from the first arcuate surface and mounted in said holder, having its sides embraced by the flanges thereof, and being disposed out of contact with the reservoir.

2. In a lubricator having an oil reservoir, a felt body having a thickened portion provided with an arcuate surface for contact with a journal to be lubricated, a holder for the felt body having lateral flanges of less height than the said thickened portion to embrace the sides thereof and give it lateral support, said felt body having a portion forming a wick depending into the reservoir to raise oil to the thickened portion, and a separate felt body similarly embraced by the holder and having an arcuate surface for contact with said journal circumferentially above the first arcuate surface and being disposed out of contact with the reservoir.

3. In a lubricator having an oil reservoir, a felt body having a thickened portion provided with an arcuate surface for contact with a journal to be lubricated, a holder for the felt body having lateral flanges of less height than the said thickened portion to embrace the sides thereof and give it lateral support, said felt body having a portion forming a wick depending into the reservoir to raise oil to the thickened portion, and a separate felt body joined to the first within the holder and having an arcuate surface for contact with said journal circumferentially above the first arcuate surface and being disposed out of contact with the reservoir.

4. In a lubricator having an oil reservoir, a felt body having a thickened portion provided with an arcuate surface for contact with a journal to be lubricated, a holder for the felt body having lateral flanges of less height than the said thickened portion to embrace the sides thereof and give it lateral support, said felt body having a portion forming a wick depending into the reservoir to raise oil to the thickened portion, and a second felt body carried by the holder out of direct communication with the reservoir and with the first felt body and having an arcuate surface for contact with said journal circumferentially above said first arcuate portion.

5. In a lubricator having an oil reservoir, a felt body having a thickened portion provided with an arcuate surface for contact with a journal to be lubricated, a holder for the felt body having lateral flanges of less height than the said thickened portion to embrace the sides thereof and give it lateral support, said felt body having a portion forming a wick depending into the reservoir to raise oil to the thickened portion, and a second felt body made fast to the first by means inhibiting direct transfer of oil from one to the other, said second felt body having an arcuate surface for contact with said journal circumferentially above the first arcuate surface and out of contact with the reservoir.

References Cited in the file of this patent

UNITED STATES PATENTS

| Number | Name | Date |
|---|---|---|
| 49,591 | Millen | Aug. 22, 1865 |
| 161,922 | Austin | Apr. 13, 1875 |
| 370,811 | Nichol | Oct. 4, 1887 |
| 1,744,390 | Kretchmar | Jan. 21, 1930 |
| 2,001,182 | Cardwell | May 14, 1935 |
| 2,540,829 | Miller | Feb. 6, 1951 |